Patented Feb. 13, 1934

1,946,818

UNITED STATES PATENT OFFICE 1,946,818

WATER PURIFICATION PROCESS

Ralph A. Stevenson, Berkeley, Calif., assignor to Great Western Electro - Chemical Co., San Francisco, Calif., a corporation of California

REISSUED

No Drawing. Application July 21, 1931
Serial No. 552,290

4 Claims. (Cl. 210—28)

This invention relates to purification of water by precipitation of suspended organic and colloidal matter and the object of the invention is to provide an improved process for carrying this out.

As is well known alum, aluminum sulfate, ferric sulfate, ferric chloride, chlorinated copperas, and similar materials are used extensively as treating agents in water purification systems. The alum (or other material) is added to the water in the amount necessary to bring about coagulation or flocculation of the colloidal and suspended matter in the water.

The coagulating properties of aluminum and iron salts seem to depend largely upon the fact that colloidal and suspended matter in water nearly always carries a negative electrical charge. This negative charge is thought to keep the particles apart by mutual repellent action. Adsorption on the colloidal and/or suspended particles of positively charged ions, such as $Fe^{+++}$ and $Al^{+++}$, neutralizes their charge and causes them to coalesce into agglomerates large enough to settle under the force of gravity.

I have discovered that if settled sludges from the treatment of water with aluminum and/or iron salts are subjected to the action of certain chemicals the particles acquire a positive charge, and the resultant material forms a superior coagulating agent exceeding in effectiveness that of the customary coagulants, such as iron and aluminum salts. For the purpose of imposing an electrical charge on the particles in question, I am not concerned with electrical means, however, but solely with chemical means as carried out by treatment with certain chemicals.

Chlorination of the sludge appears to be the best method for imparting the charge to the particles of sludge. This is especially the case in sludges high in iron and aluminum, for example those previously mentioned as resulting from the treatment of water with iron and aluminum salts. Chlorination is, however, also effective as a means of positively charging other types of sludges and other finely divided solid materials.

The chlorination should usually be done in an enclosed system so as to prevent loss of chlorine gas. It may be carried out either in a batch or a continuous process, the time factor being properly regulated in all cases to secure the desired degree of chlorination. The chlorination may be either partial or complete. Partial chlorination is preferable in most cases. The time necessary to secure a given degree of chlorination depends upon the temperature, and the character of the material being chlorinated.

The chlorination may be accomplished more advantageously in certain cases by means of hypochlorous acid and/or ferric chloride. The word "chlorination" as hereinafter used shall be construed so as to include the possible use of these other forms of chlorine in the process.

In some cases it may be found advantageous to use the chlorinated sludge in conjunction with other coagulants, e. g. ferric chloride and/or aluminum chloride. In such cases, the heavy metal salt, either dry or in solution, may be added to the sludge before chlorination, added to the sludge after chlorination, or added separately to the water being treated.

A typical application of the invention is as follows:—

The settled sludge containing about 20% solids from water which has been treated with alum in the usual way is removed from the settling tanks to a suitable apparatus and chlorinated by bubbling chlorine through it until it has absorbed about 1% by weight of the gas. After chlorination the chlorinated sludge is used to treat water in a manner similar to that in which the alum was originally used, that is by addition and trituration, the amount required depending on the condition of the water. The sludge which forms from this treatment may again be removed and chlorinated as described and again used for water treatment. With certain types of waters, this cycle may be repeated indefinitely. In other cases the sludge may be discarded after being used only once. In still other cases, the sludge may be treated to recover certain of its constituents. In my appended claims, the words "water purification" shall be understood as meaning not only ordinary water treatment, but also the treatment of other aqueous solutions or sludges, for example, sewage, dye plant wastes, and various other industrial colloidal suspensions. The word "sludge" shall be understood as meaning any suspension or mixture of finely divided solid materials which has been precipitated or dispersed in an aqueous medium.

Among the advantages of the above method of treatment are the following:

1. The cost of the treated sludge is much less than that of the usual treating agents for equal coagulating value, 2. A minimum amount of undesirable soluble matter is introduced, 3. A marked sterilizing action is effected in the treated water or other solution, 4. The particles of the coagulum are coarser and settle more rapidly, 5. The floc produced is much more rugged than that produced with other coagulants and does not break down on agitation, 6. The time necessary to bring about coagulation is less than with other coagulants and the purification plant may be correspondingly smaller for the same capacity.

I claim:

1. The process of water purification which includes the separate chlorination of sludge removed from a body of aqueous media and the application of such separately chlorinated sludge to the precipitation of undesirable suspended matter in water.

2. The process of water purification which includes the separate chlorination of sludge removed from a body of aqueous media and the application of such separately chlorinated sludge to the precipitation of undesirable suspended matter in water followed by removal of the sludge thus precipitated from the media and re-chlorination of the separated sludge for re-application to the precipitation of undesirable suspended matter in water.

3. The process of water purification which includes the separate chlorination of sludge removed from a body of aqueous media and the application of such separately chlorinated sludge together with other coagulants to the precipitation of undesirable suspended matter in water.

4. The process of water or sewage purification which comprises introducing and agitating into the aqueous body metallic compounds adapted to form a sludge with the undesirable suspended matter, removing part of the settled sludge to a separate container, chlorinating the removed sludge, and reapplying it to the aqueous body while continually introducing further aqueous media to be treated.

RALPH A. STEVENSON.